(12) United States Patent
Sasaki

(10) Patent No.: US 6,315,875 B1
(45) Date of Patent: Nov. 13, 2001

(54) METHOD OF MANUFACTURING THIN-FILM MAGNETIC HEAD AND METHOD OF MANUFACTURING MAGNETORESISTIVE DEVICE

(75) Inventor: Yoshitaka Sasaki, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/642,639

(22) Filed: Aug. 22, 2000

(30) Foreign Application Priority Data

Sep. 16, 1999 (JP) .................................................. 11-261500

(51) Int. Cl.[7] .............................. C23C 1/02; C23F 1/00; G11B 5/00

(52) U.S. Cl. .............................. 204/192.34; 204/192.35; 216/66; 216/22

(58) Field of Search .......................... 204/192.2, 192.34, 204/192.35; 216/66, 22; 427/130, 271

(56) References Cited

U.S. PATENT DOCUMENTS 5,897,969   4/1999   Taniyama et al. .................... 428/692
5,978,184 * 11/1999   Terunuma ............................ 360/113

FOREIGN PATENT DOCUMENTS

A-7-296333   11/1995   (JP) .

* cited by examiner

*Primary Examiner*—Nam Nguyen
*Assistant Examiner*—Gregg Cantelmo
(74) *Attorney, Agent, or Firm*—Oliff & Berridge, PLC

(57) ABSTRACT

A thin-film magnetic head comprises a reproducing head and a recording head. The reproducing head includes: a GMR element; a bottom shield layer and a top shield layer for shielding the GMR element; a conductive layer connected to the GMR element; and first to fourth shield gap films placed between the shield layers. A plurality of layers making up the GMR element are formed on the first shield gap film. Reactive ion etching is performed to etch a part of the thickness of these layers. Ion milling is then performed to etch the remaining part. The GMR element is thus formed. The second shield gap film is formed around the GMR element on the first shield gap film.

25 Claims, 16 Drawing Sheets

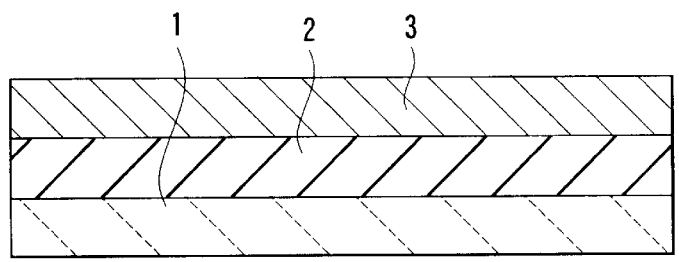
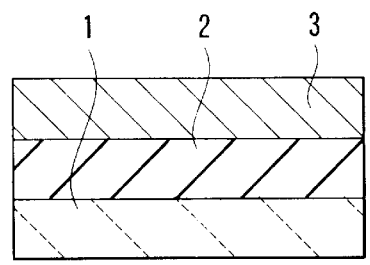
FIG. 1A       FIG. 1B
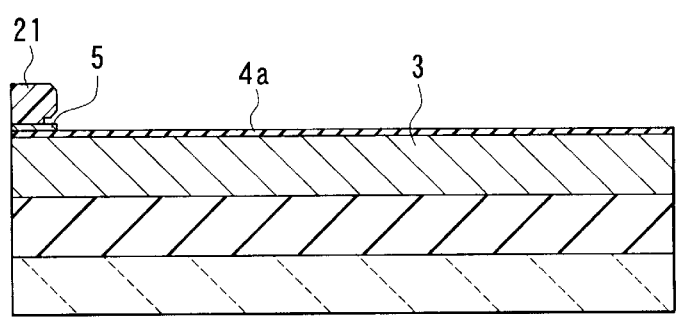
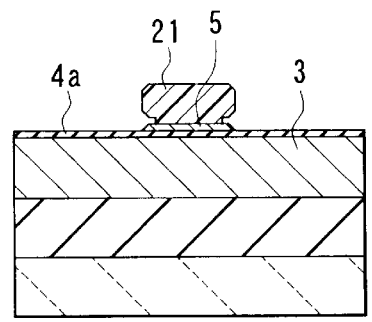
FIG. 2A       FIG. 2B

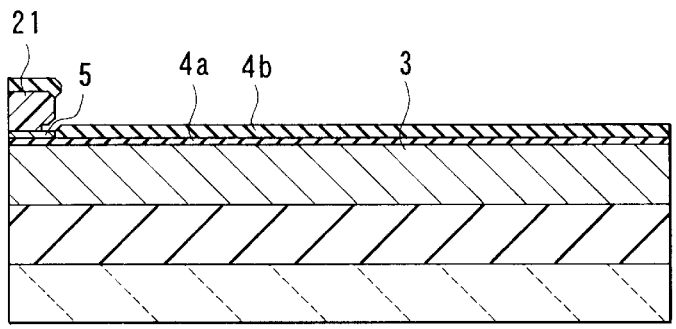
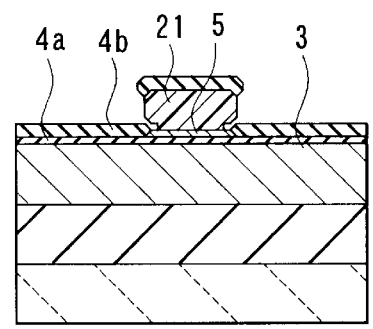
FIG. 3A  FIG. 3B
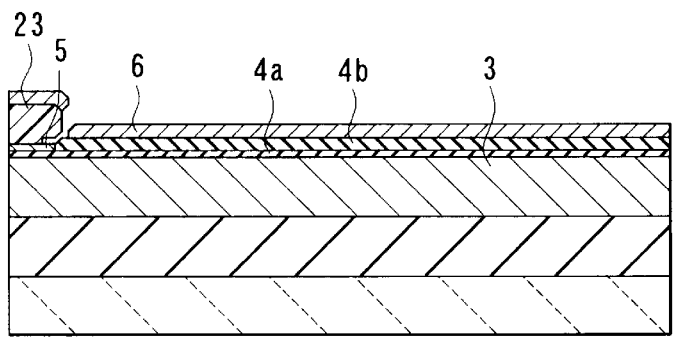
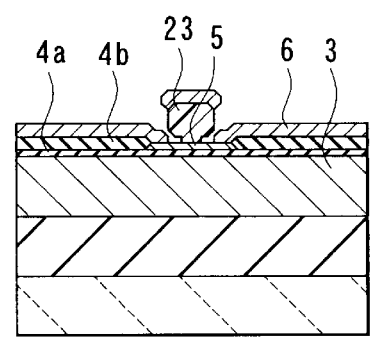
FIG. 4A  FIG. 4B

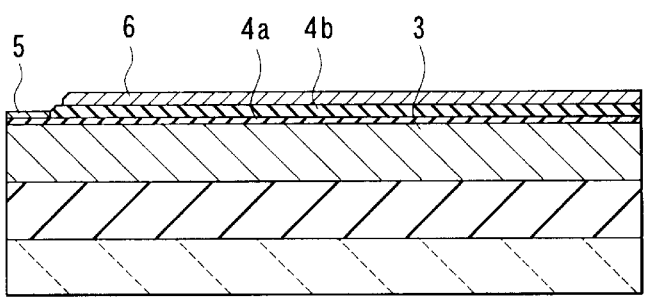
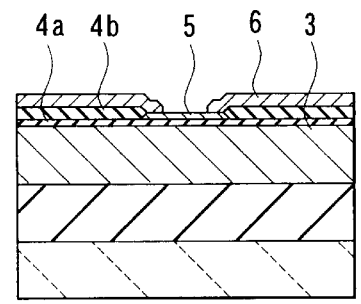
FIG. 5A
FIG. 5B
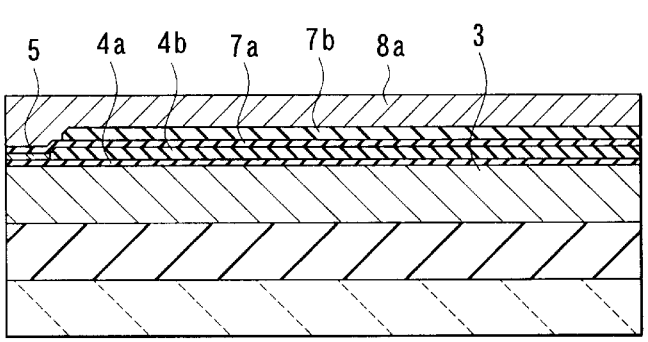
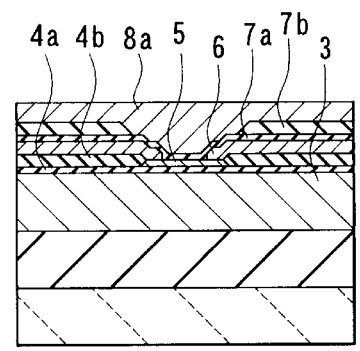
FIG. 6A
FIG. 6B

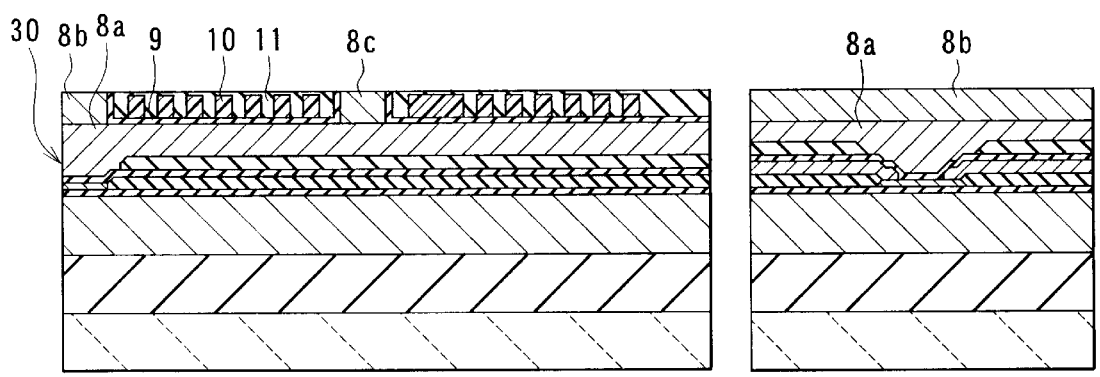
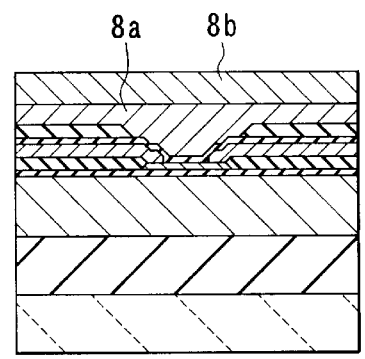
FIG. 7A  FIG. 7B
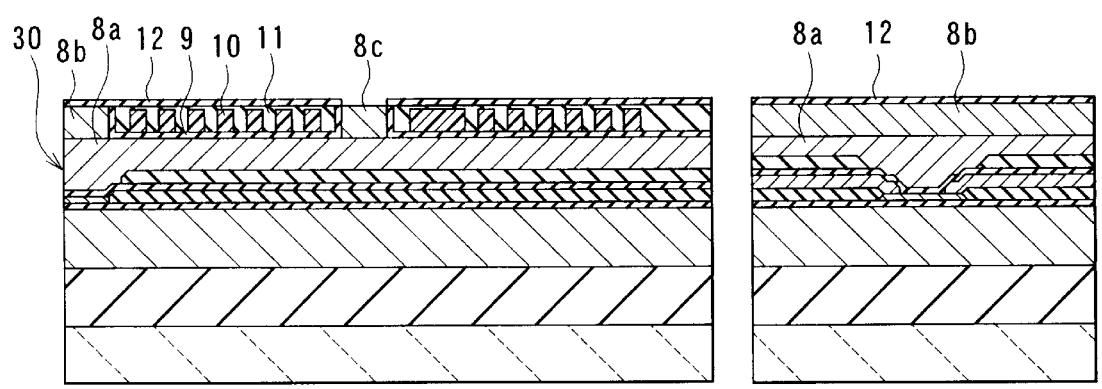
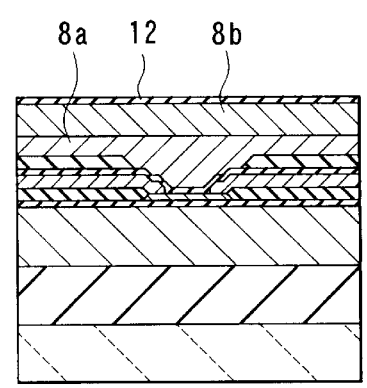
FIG. 8A  FIG. 8B

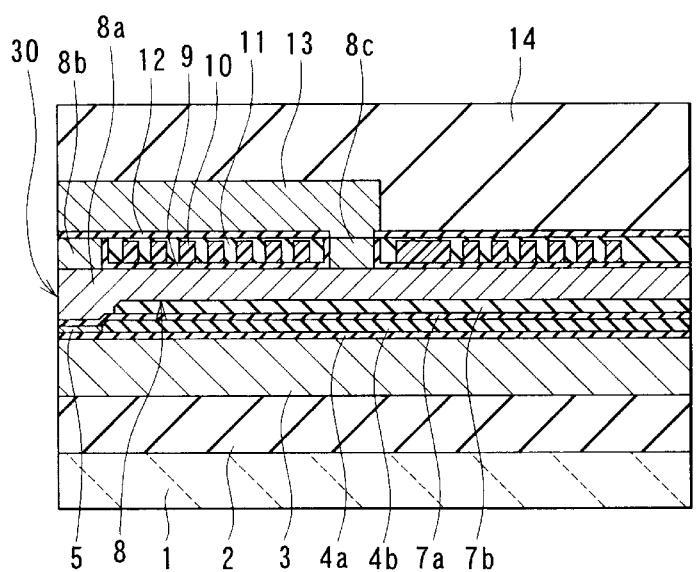
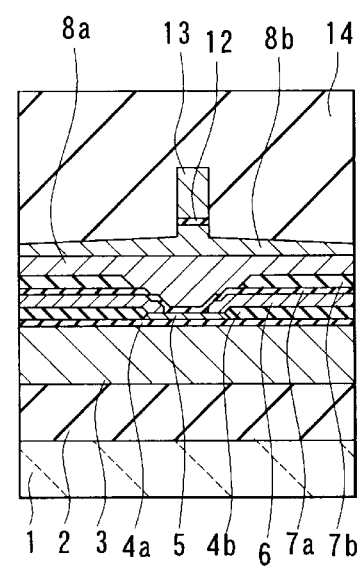
FIG. 9A
FIG. 9B

METHOD OF MANUFACTURING THIN-FILM MAGNETIC HEAD AND METHOD OF MANUFACTURING MAGNETORESISTIVE DEVICE

BACKGROUND OF THE INVENTION

1. Field of the Invention

The present invention relates to a method of manufacturing a thin-film magnetic head having at least a magnetoresistive element for reading, and to a magnetoresistive device having a magnetoresistive element.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Many of reproducing heads have a structure in which the MR element is electrically and magnetically shielded by a magnetic material.

Reference is now made to FIG. 21 to FIG. 26 to describe an example of a manufacturing method of a composite thin-film magnetic head as an example of a related-art manufacturing method of a thin-film magnetic head. This composite head incorporates a spin valve GMR element as a reproducing head. FIG. 21 to FIG. 24 are cross sections each parallel to the air bearing surface of the pole portion of the head.

According to the manufacturing method, as shown in FIG. 21, an insulating layer 102 made of alumina ($Al_2O_3$), for example, and having a thickness of about 5$\mu$m is deposited on a substrate 101 made of aluminum oxide and titanium carbide ($Al_2O_3$-TiC), for example. On the insulating layer 102 a bottom shield layer 103 made of a magnetic material and having a thickness of 2 to 3$\mu$m is formed for a reproducing head.

Next, on the bottom shield layer 103, a first shield gap film 104a as an insulating layer made of an insulating material such as alumina is deposited to a thickness of 20 to 40 nm, for example, through sputtering. Next, a second shield gap film 104b as an insulating layer made of an insulating material such as alumina is deposited to a thickness of 50 to 150 nm, for example, through sputtering in a region on the first shield gap film 104a except where a GMR element described later is to be formed.

On the second shield gap film 104b a plurality of layers making up the GMR element for reproduction are formed. These layers are: an antiferromagnetic layer 105a having a thickness of about 10 to 20 nm; a nonmagnetic layer 105b having a thickness of about 2 to 3 nm; and a free layer (magnetic layer) 105c having a thickness of about 3 to 6 nm. These layers are formed in this order. In addition to these layers, layers such as a magnetic layer to be a pin layer may be required, if necessary, for making up the GMR element. However, the three layers 105a, 105b and 105c are only illustrated in the following description for simplification.

Next, on the free layer 105c a photoresist pattern 121 is selectively formed where the GMR element is to be formed. The photoresist pattern 121 is formed into a shape that facilitates lift-off, such as a shape having a T-shaped cross section.

Next, as shown in FIG. 22, with the photoresist pattern 121 as a mask, the above-mentioned layers 105a, 105b and 105c making up the GMR element are selectively etched through ion milling, for example, and patterned to form the GMR element 105.

Next, as shown in FIG. 23, using the photoresist pattern 121 as a mask, a pair of conductive layers (that may be called leads) 106 whose thickness is tens to a hundred and tens of nanometers, for example, are formed into specific shapes on the first shield gap film 104a and the second shield gap film 104b. The conductive layers 106 are electrically connected to the GMR element 105. Next, the photoresist pattern 121 is lifted off. FIG. 25 is a top view illustrating the second shield gap film 104b, the GMR element 105 and the conductive layers 106 at this point in the manufacturing steps.

Next, as shown in FIG. 24, a third shield gap film 107a made of an insulating material such as alumina and having a thickness of 20 to 40 nm, for example, is formed through sputtering, for example, as an insulating layer on the shield gap films 104a and 104b, the GMR element 105 and the conductive layers 106. The GMR element 105 is embedded in the shield gap films 104a and 107a. Next, a fourth shield gap film 107b made of an insulating material such as alumina and having a thickness of 50 to 150 nm, for example, is formed through sputtering, for example, as an insulating layer in a region on top of the third shield gap film 107a except the neighborhood of the GMR element 105.

Next, on the shield gap films 107a and 107b, a top-shield-layer-cum-bottom-pole-layer (called a top shield layer in the following description) 108 having a thickness of about 3$\mu$m is formed. The top shield layer 108 is made of a magnetic material and used for both a reproducing head and a recording head.

Next, on the top shield layer 108, a recording gap layer 112 made of an insulating film such as an alumina film whose thickness is 0.2 to 0.3$\mu$m is formed. Although not shown, a contact hole is formed through selectively etching a portion of the recording gap layer 112 in a center portion of a region where a thin-film coil described later is formed.

Next, although not shown, on the recording gap layer 112, a first photoresist layer for determining the throat height is formed into a specific shape whose thickness is about 1.0 to 2.0$\mu$m. The throat height is the length (height) of portions of the two magnetic layers of the recording head between an end located in the air bearing surface (the medium facing surface that faces toward a recording medium) and the other end, the portions facing each other with the recording gap layer in between.

Next, on the first photoresist layer, the thin-film coil of the recording head is formed. The thickness of the coil is 3$\mu$m, for example. Next, a second photoresist layer for insulating the thin-film coil is formed into a specific shape on the first photoresist layer and the coil. FIG. 26 is a top view illustrating the state at this point of the manufacturing steps in a simplified manner. In FIG. 26 numeral 113 indicates the thin-film coil illustrated in a simplified manner. Numeral 131 indicates conductive layers formed on ends of the conductive layers 106 farther from the GMR element 105. Numeral 132 indicates conductive layers connected to the conductive layers 131. The conductive layers 131 may be made of a material the same as that of the top shield layer 108 and formed at the same time as the top shield layer 108. The conductive layers 132 may be made of a material the same as that of the thin-film coil 113 and formed at the same time as the coil 113.

Next, as shown in FIG. 24, a top pole layer 114 having a thickness of about 3μm is formed for the recording head on the recording gap layer 112 and the first and second photoresist layers. The top pole layer 114 is made of a magnetic material such as Permalloy (NiFe) and is in contact with and magnetically coupled to the top shield layer (bottom pole layer) 108 through the contact hole formed in the center portion of the region where the thin-film coil is formed.

Next, the recording gap layer 112 and a portion of the top shield layer (bottom pole layer) 108 are etched through ion milling, for example, using the top pole layer 114 as a mask. As shown in FIG. 24, the structure is called a trim structure wherein the sidewalls of the top pole layer 114, the recording gap layer 112, and a part of the top shield layer (bottom pole layer) 108 are formed vertically in a self-aligned manner. The trim structure suppresses an increase in the effective track width due to expansion of the magnetic flux generated during writing in a narrow track.

Next, an overcoat layer 115 of alumina, for example, having a thickness of 20 to 30μm is formed to cover the top pole layer 114. Finally, lapping of the slider including the foregoing layers is performed to form the air bearing surface of the head including the recording head and the reproducing head. The thin-film magnetic head is thus completed.

As the performance of a reproducing head improves, a problem of thermal asperity comes up. Thermal asperity is a reduction in reproducing characteristics due to self-heating of the reproducing head during reproduction. To overcome such thermal asperity, a material having an excellent cooling efficiency has been sought for making the bottom pole layer and the shield gap films. The bottom pole layer is therefore made of a magnetic material such as Permalloy or Sendust in the prior art. Recently, a method has been taken, such as reducing the thickness of each shield gap film down to 20 to 50 nm, for example, in order to increase the cooling efficiency.

However, such thin shield gap films cause a problem that faults may result in the magnetic and electrical insulation that isolates the shield layers from the MR element (including the GMR element) or the conductive layers connected thereto.

In relation to this problem, another problem of the prior-art thin-film magnetic head is a short circuit between the shield layers and the MR element or the conductive layers connected thereto. This problem will now be described, referring to the example shown in FIG. 21 to FIG. 26.

In the method of manufacturing the thin-film magnetic head of the related art, as shown in FIG. 22, the layers 105a, 105b and 105c making up the GMR element are selectively etched through ion milling, for example, with the photoresist pattern 121 as a mask. The GMR element 105 is thus formed. The width and length of the GMR element 105 thereby defined determine the track width and the MR height (the length [height] of the MR element between the air-bearing-surface-side end and the other end) of the reproducing head. Therefore, over-etching is required to some extent when the layers 105a, 105b and 105c are etched through ion milling. Consequently, as shown in FIG. 22, the very thin first shield gap film 104a having a thickness of 20 to 40 nm may be damaged or etched and holes may be thus formed in the shield gap film 104a.

If the conductive layers 106 are formed, as shown in FIG. 23, while the first shield gap film 104a has holes, a short circuit is created between the bottom shield layer 103 and the conductive layers 106. Such a short circuit results in an increase in noise that affects the GMR element 105.

In Published Unexamined Japanese Patent Application Hei 7-296333 (1995), a technique is disclosed for making an insulating film in a region where the shield gap film is reduced in thickness because of ion milling for making the MR element. However, this technique will not reduce the damage itself to the shield gap film caused by ion milling.

In the related art, as shown in FIG. 22, an end of the geometry of the GMR element 105 is taper-etched. However, such taper-etching makes it more difficult to control the track width and the MR height with accuracy, as the track width and the MR height are reduced, in particular. Taper-etching is therefore one of the factors that reduce the yield.

OBJECT AND SUMMARY OF THE INVENTION

It is an object of the invention to provide a method of manufacturing a thin-film magnetic head and a method of manufacturing a magnetoresistive device for preventing a short circuit between a shield layer and a conductive layer connected to a magnetoresistive element, and for defining the geometry of the magnetoresistive element with accuracy.

A method of the invention is provided for manufacturing a thin-film magnetic head comprising: a medium facing surface that faces toward a recording medium; a magnetoresistive element; a first shield layer and a second shield layer for shielding the magnetoresistive element, the shield layers having portions located on a side of the medium facing surface and opposed to each other, the magnetoresistive element being placed between the portions; a conductive layer connected to the magnetoresistive element; a first insulating layer provided between the first shield layer and the magnetoresistive element together with the conductive layer; a second insulating layer provided between the first insulating layer and the conductive layer and located around the magnetoresistive element; and a third insulating layer provided between the second shield layer and the magnetoresistive element together with the conductive layer.

Another method of the invention is provided for manufacturing a magnetoresistive device comprising: a magnetoresistive element; a first shield layer and a second shield layer for shielding the magnetoresistive element, the shield layers being opposed to each other, the magnetoresistive element being placed between the shield layers; a conductive layer connected to the magnetoresistive element; a first insulating layer provided between the first shield layer and the magnetoresistive element together with the conductive layer; a second insulating layer provided between the first insulating layer and the conductive layer and located around the magnetoresistive element; and a third insulating layer provided between the second shield layer and the magnetoresistive element together with the conductive layer.

The method of manufacturing the thin-film magnetic head or the method of manufacturing the magnetoresistive device of the invention includes the steps of: forming the first shield layer; forming the first insulating layer on the first shield layer; forming a film for making the magnetoresistive element on the first insulating layer; forming the magnetoresistive element by selectively etching the film for making the magnetoresistive element; forming the second insulating layer on the first insulating layer; forming the conductive layer on the second insulating layer; forming the third insulating layer on the magnetoresistive element, the second insulating layer and the conductive layer; and forming the second shield layer on the third insulating layer. The step of forming the magnetoresistive element includes: a first etching step wherein a first dry etching is performed to etch a part of a thickness of a portion to be etched of the film for making the magnetoresistive element, the first dry etching including a chemical etching aspect and a physical etching aspect; and a second etching step wherein a second dry etching is performed to etch the remaining part of the portion of the film for making the magnetoresistive element, the second dry etching having a proportion of physical etching greater than that of the first dry etching.

According to the method of manufacturing the thin-film magnetic head or the method of manufacturing the magnetoresistive device of the invention, in the first etching step of the step of forming the magnetoresistive element, the first dry etching is performed to etch a part of the thickness of the portion to be etched of the film for making the magnetoresistive element. The first dry etching includes a chemical etching aspect and a physical etching aspect. In the second etching step the second dry etching is performed to etch the remaining part of the portion of the film for making the magnetoresistive element. The second dry etching has a proportion of physical etching greater than that of the first dry etching. As a result, damage to the first insulating layer is suppressed, and it is possible to define the geometry of the magnetoresistive element with accuracy.

According to the method of manufacturing the thin-film magnetic head or the method of manufacturing the magnetoresistive device of the invention, the first dry etching may be reactive ion etching. The second dry etching may be ion milling.

According to the method of manufacturing the thin-film magnetic head or the method of manufacturing the magnetoresistive device of the invention, the magnetoresistive element may be made up of a plurality of layers. In this case, each of the methods may further include the steps of after the second insulating layer is formed, etching portions of one or some upper layers of the layers making up the magnetoresistive element, the portions thus etched being outer portions of a part that defines a track width, these portions being located at ends of the width of this part; and, after this etching step, forming an additional layer made of a material the same as that of the layer or layers etched and an antiferromagnetic layer stacked on the additional layer, the additional layer and the antiferromagnetic layer being formed around the portions etched and the magnetoresistive element. In this case, the conductive layer is formed on the antiferromagnetic layer in the step of forming the conductive layer.

According to the method of manufacturing the thin-film magnetic head or the method of manufacturing the magnetoresistive device of the invention, the magnetoresistive element may be a spin valve giant magnetoresistive element in which a free layer is located in an upper portion thereof. In this case, each of the methods may further include the steps of: after the second insulating layer is formed, etching portions of the free layer of the magnetoresistive element, the portions thus etched being outer portions of a part that defines a track width, these portions being located at ends of the width of this part; and, after this etching step, forming an additional layer made of a material the same as that of the free layer and an antiferromagnetic layer stacked on the additional layer, the additional layer and the antiferromagnetic layer being formed around the portions etched and the magnetoresistive element. In this case, the conductive layer is formed on the antiferromagnetic layer in the step of forming the conductive layer.

Each of the methods of the invention may further include the step of removing a portion of the second insulating layer extending over a top surface of the magnetoresistive element after the second insulating layer is formed.

In each of the methods of the invention, an alumina film may be formed as the insulating layer through chemical vapor deposition in at least one of the step of forming the first insulating layer and the step of forming the third insulating layer. In this case, the chemical vapor deposition may be low-pressure chemical vapor deposition, or plasma chemical vapor deposition.

In each of the methods of the invention, an alumina film may be formed as the insulating layer through chemical vapor deposition at a temperature of 300° C. or lower in the step of forming the third insulating layer.

The method of manufacturing the thin-film magnetic head of the invention may further include the step of forming an induction-type magnetic transducer including: first and second magnetic layers magnetically coupled to each other and including magnetic pole portions opposed to each other, the pole portions being located in regions on a side of the medium facing surface, the magnetic layers each including at least one layer; a gap layer placed between the pole portions of the magnetic layers; and a thin-film coil at least a part of which is placed between the magnetic layers, the at least part of the coil being insulated from the magnetic layers.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of an embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 8A and FIG. 8B are cross sections for illustrating a step that follows FIG. 7A and FIG. 7B.

FIG. 9A and FIG. 9B are cross sections for illustrating a step that follows FIG. 8A and FIG. 8B.

DETAILED DESCRIPTION OF THE PREFERRED EMBODIMENT

Figure 10:
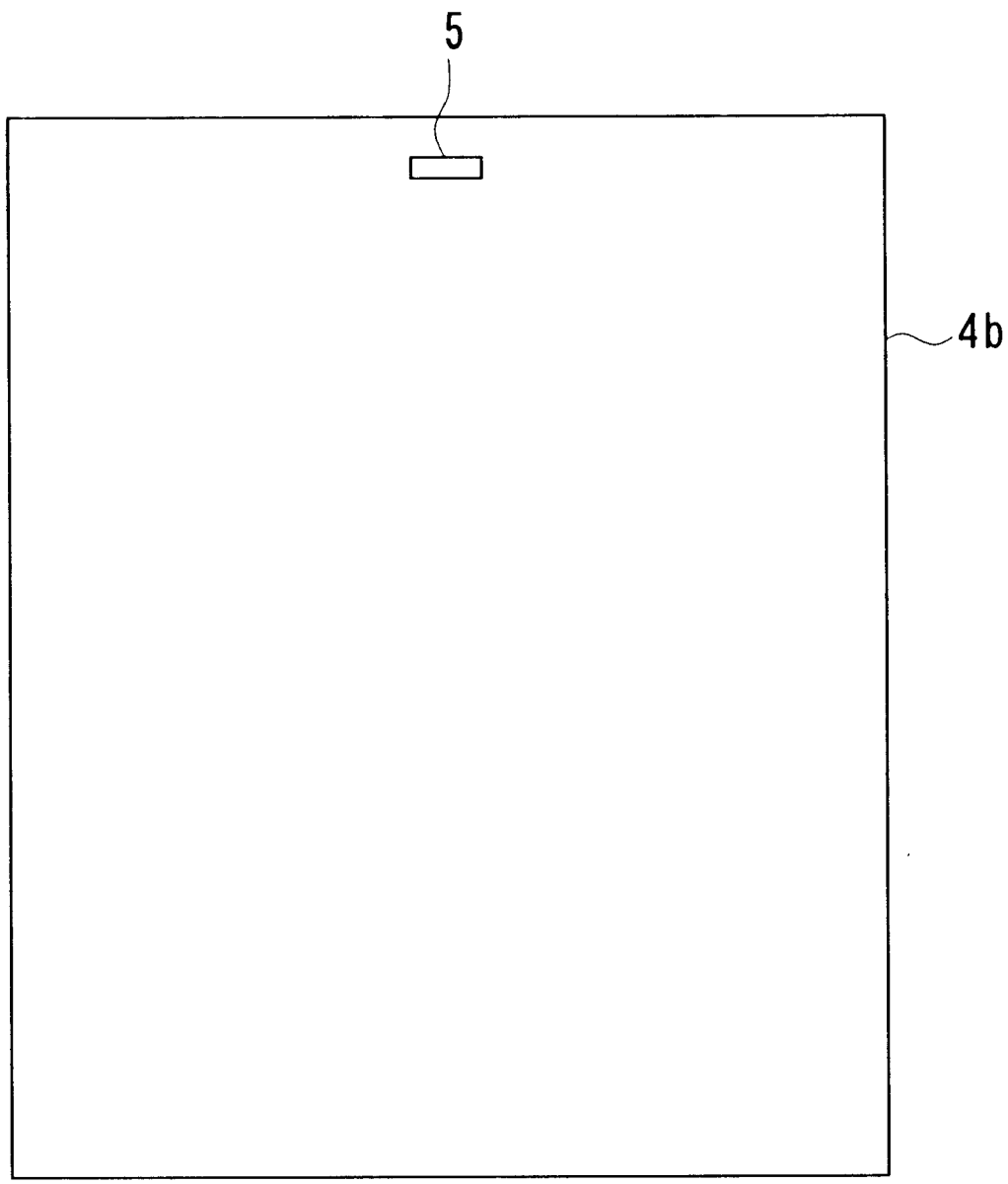
FIG. 10 is a top view corresponding to FIG. 3A and FIG. 3B.

A preferred embodiment of the invention will now be described in detail with reference to the accompanying drawings. Reference is now made to FIG. 1A to FIG. 9A, FIG. 1B to FIG. 9B, and FIG. 10 to FIG. 12 to describe an outline of a method of manufacturing a thin-film magnetic head, and a method of manufacturing a magnetoresistive device of an embodiment of the invention. In this embodiment the reproducing head of the thin-film magnetic head is a spin valve GMR element. FIG. 1A to FIG. 9A are cross sections each orthogonal to the air bearing surface of the thin-film magnetic head. FIG. 1B to FIG. 9B are cross sections each parallel to the air bearing surface of the pole portion of the head.

In the method of manufacturing the thin-film magnetic head of the embodiment, as shown in FIG. 1A and FIG. 1B, an insulating layer 2 made of alumina ($Al_2O_3$), for example, having a thickness of about 5µm is deposited on a substrate 1 made of aluminum oxide and titanium carbide ($Al_2O_3$-TiC), for example. On the insulating layer 2 a bottom shield layer 3 made of a magnetic material and having a thickness of 2 to 3µm is formed for a reproducing head.

Next, as shown in FIG. 2A and FIG. 2B, on the bottom shield layer 3, a first shield gap film 4a as a first insulating layer is deposited to a thickness of 10 to 20 nm, for example. An insulating material used for the shield gap film 4a may be any of alumina, aluminum nitride, diamond-like carbon (DLC), and so on. The shield gap film 4a may be fabricated through sputtering or chemical vapor deposition (CVD). CVD may be low-pressure CVD or plasma CVD, for example. If the shield gap film 4a made of an alumina film is formed through CVD, materials used are trimethyl aluminum ($Al(CH_3)_3$) and $H_2O$, for example. Through the use of CVD, it is possible to make the thin and precise shield gap film 4a of high quality with few pinholes.

Next, on the bottom shield gap film 4a, a plurality of layers making up the GMR element for reproduction are formed. Next, on top of the highest layer of those layers, a photoresist pattern 21 is selectively formed where the GMR element is to be formed. The photoresist pattern 21 is formed into a shape that facilitates lift-off, such as a shape having a T-shaped cross section. Next, with the photoresist pattern 21 as a mask, the layers making up the GMR element are selectively etched and patterned to form the GMR element 5. The procedure of making the GMR element 5 will be described later in detail.

Next, as shown in FIG. 3A and FIG. 3B, using the photoresist pattern 21 as a mask, a second shield gap film 4b as a second insulating layer is formed through sputtering, for example, around the GMR element 5 on top of the shield gap film 4a. The second shield gap film 4b is made of an insulating material such as alumina and has a thickness of 100 to 300 nm, for example. The photoresist pattern 21 is then lifted off. Next, the top surface of the GMR element 5 is etched by about 1 nm to remove a portion of the second shield gap film 4b extending over the top surface of the GMR element 5.

FIG. 10 is a top view illustrating the GMR element 5 and the second shield gap film 4b at this point in the manufacturing steps.

Next, as shown in FIG. 4A and FIG. 4B, an additional photoresist pattern 23 for determining the track width of the reproducing head is formed on the GMR element 5. The photoresist pattern 23 is formed into a shape that facilitates lift-off, such as a shape having a T-shaped cross section. Next, with the photoresist pattern 23 as a mask, a pair of conductive layers 6 whose thickness is tens to a hundred and tens of nanometers are formed on the second shield gap film 4b. The conductive layers 6 are electrically connected to the GMR element 5. The procedure of making the conductive layers 6 will be described later in detail.

Next, as shown in FIG. 5A and FIG. 5B, the photoresist pattern 23 is lifted off. Next, although not shown, a film of copper (Cu) having a thickness of 50 to 100 nm is formed on the conductive layers 6 through a lift-off process in order to reduce the resistance of the conductive layers 6.

FIG. 4A and FIG. 5A are cross sections passing through the conductive layers 6. FIG. 6A to FIG. 9A are cross sections not passing through the conductive layers 6.

Next, as shown in FIG. 6A and FIG. 6B, a third shield gap film 7a having a thickness of 20 to 40 nm, for example, is formed as a third insulating layer on the GMR element 5, the second shield gap film 4b and the conductive layers 6. An insulating material used for the shield gap film 7a may be any of alumina, aluminum nitride, diamond-like carbon (DLC), and so on. The shield gap film 7a may be fabricated through sputtering or CVD. CVD may be low-pressure CVD or plasma CVD, for example. If the shield gap film 7a made of an alumina film is formed through CVD, materials used are trimethyl aluminum ($Al(CH_3)_3$) and $H_2O$, for example. Through the use of CVD, it is possible to make the thin and precise shield gap film 7a of high quality with few pinholes. When the shield gap film 7a made of an alumina film is formed through CVD, it is preferred to perform CVD at a temperature of 300° C. or lower to prevent deterioration of a layer susceptible to heat among the layers making up the GMR element 5.

Next, a fourth shield gap film 7b is formed through sputtering, for example, in a region on top of the shield gap film 7a except the region corresponding to the GMR element 5. The fourth shield gap film 7b is made of an insulating material such as alumina and has a thickness of 50 to 150 nm, for example.

Next, on the shield gap films 7a and 7b, a first layer 8a of a top-shield-layer-cum-bottom-pole-layer (called a top shield layer in the following description) 8 is formed through sputtering, for example. The top shield layer 8 is used for both a reproducing head and a recording head. The first layer 8a is made of a magnetic material such as NiFe and has a thickness of 1 to 2μm, for example. At the same time, conductive layers having a thickness of 1 to 2μm, for example, are formed on top of ends of the conductive layers 6 opposite to the GMR element 5. The conductive layers are made of the same material as the first layer 8a of the top shield layer 8.

The top shield layer 8 is made up of a second layer 8b and a third layer 8c described later, in addition to the first layer 8a. The first layer 8a is located to face at least a part of the coil described later.

Figure 11:
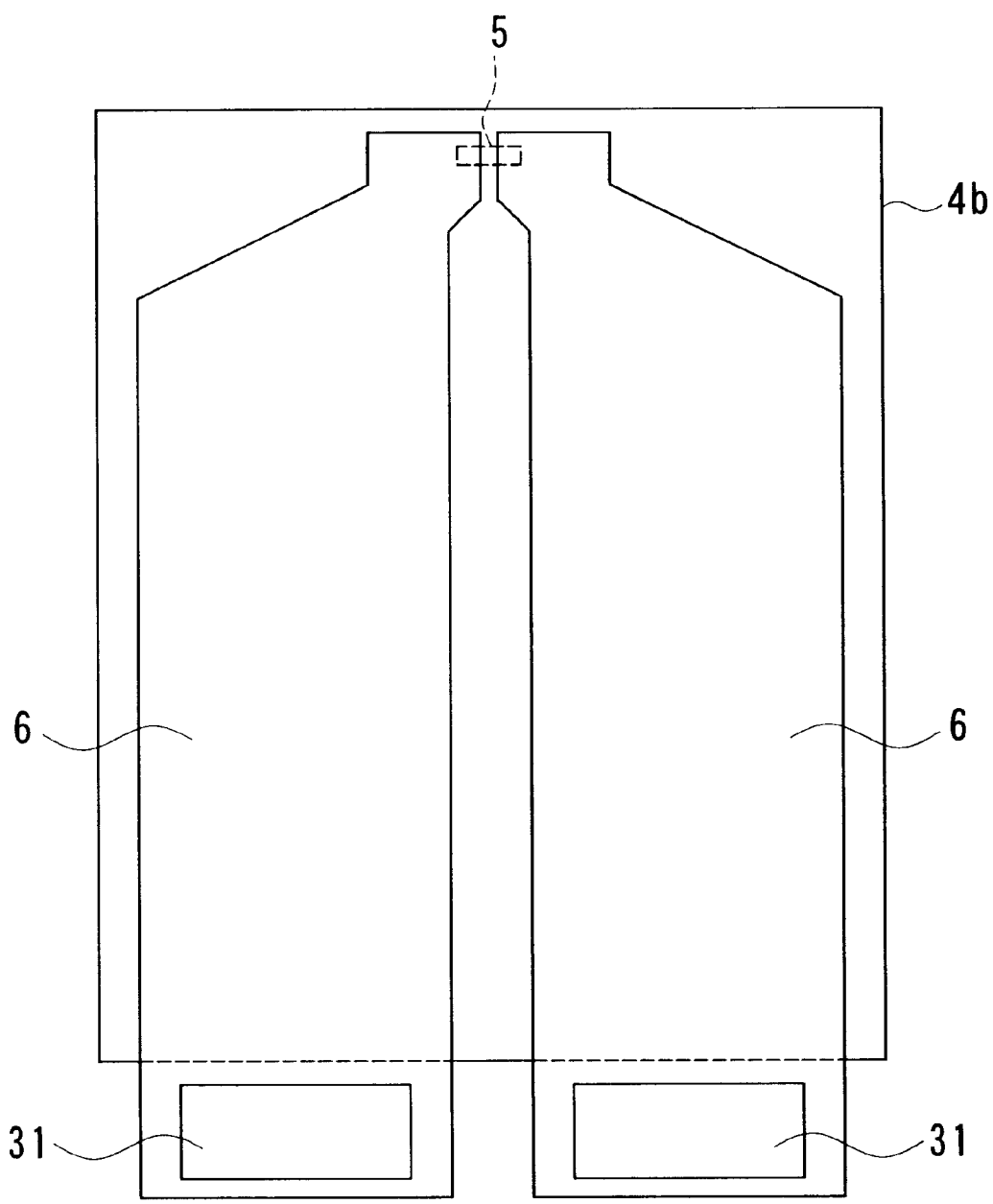
FIG. 11 is a top view corresponding to FIG. 6A and FIG. 6B.

FIG. 11 is a top view illustrating the state at this point in the manufacturing steps in a simplified manner, wherein numeral 31 indicates conductive layers formed on top of ends of the conductive layers 6 opposite to the GMR element 5. The first layer 8a of the top shield layer 8 is omitted in FIG. 11.

Next, as shown in FIG. 7A and FIG. 7B, the second layer 8b and the third layer 8c of the top shield layer 8 are formed through plating on the first layer 8a of the top shield layer 8. The second layer 8b and the third layer 8c are made of a magnetic material such as NiFe and have a thickness of 1.5 to 2.0μm, for example. The second layer 8b has an end face located in the air bearing surface (the medium facing surface that faces toward a recording medium) 30. The third layer 8c is a portion for connecting the first layer 8a of the top shield layer 8 to a top pole layer described later. The third layer 8c is formed in a center portion of the region where a thin-film coil described later is to be formed. In this embodiment the second layer 8b of the top shield layer 8 defines the throat height. In other words, the zero throat height position, that is, the position of an end of the pole portion opposite to the air bearing surface 30, is the position of an end of the second layer 8b opposite to the air bearing surface 30 (that is, on the right side of FIG. 7A).

The second layer 8b and the third layer 8c of the top shield layer 8 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering and then selectively etched through ion milling, for example, into the specific shapes. Alternatively, a high saturation flux density material such as CoFe or a Co-base amorphous material may be used.

Next, an insulating film 9 made of alumina, for example, and having a thickness of about 0.3 to 0.5μm is formed over the entire surface.

Next, the thin-film coil 10 made of copper (Cu), for example, and having a thickness of 1 to 2μm, for example, is formed through frame plating. The coil 10 is wound around the third layer 8c of the top shield layer 8. A portion of the coil 10 is located on a side of the second layer 8b of the top pole layer 8 (that is, the right side of FIG. 7A). At the same time, conductive layers connected to the conductive layers 31 and made of the same material as the coil 10 are formed.

Figure 12:
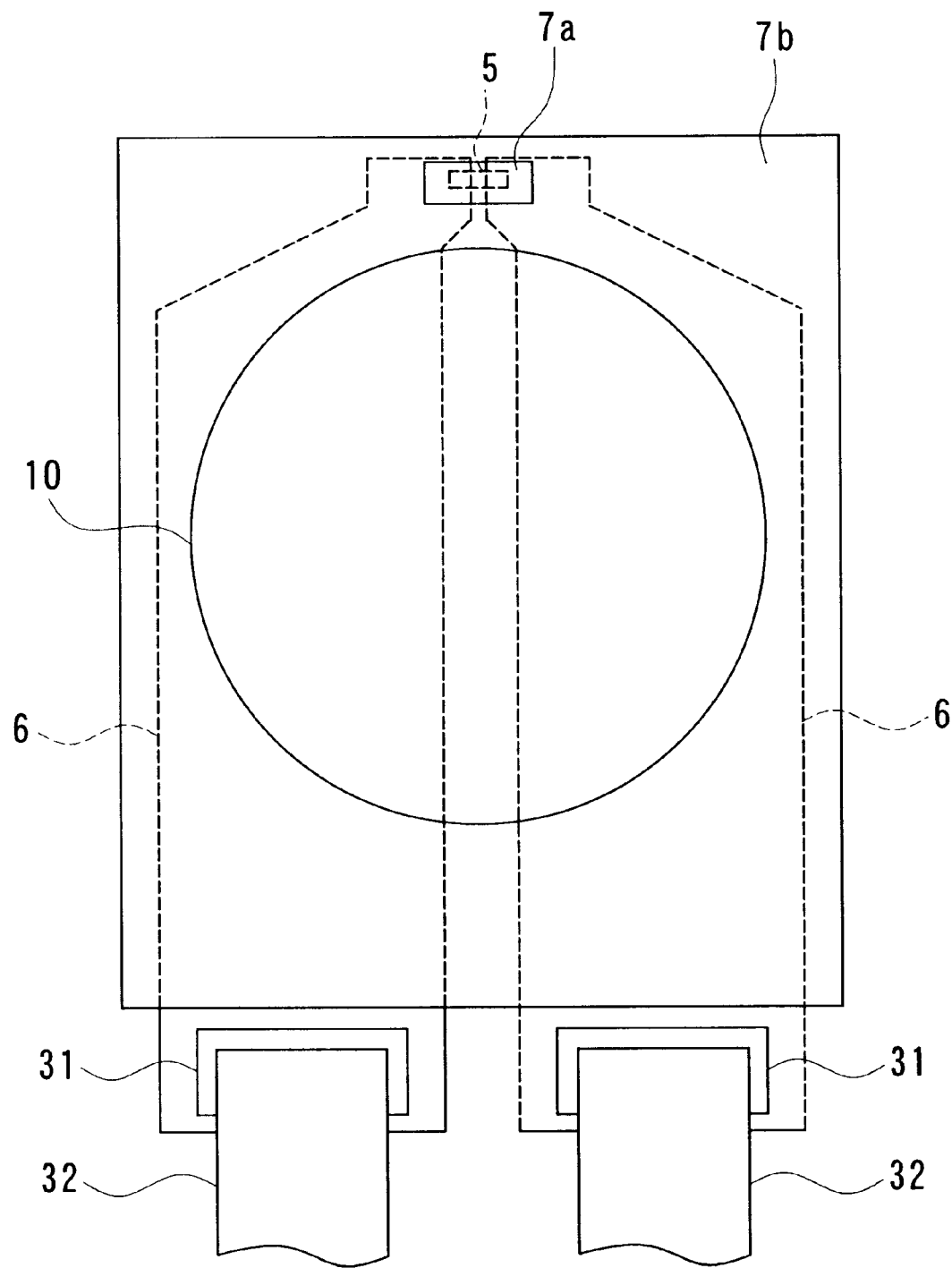
FIG. 12 is a top view corresponding to FIG. 7A and FIG. 7B.

FIG. 12 is a top view illustrating the state at this point in the manufacturing steps in a simplified manner, wherein numeral 32 indicates conductive layers connected to the conductive layers 31.

Next, as shown in FIG. 7A and FIG. 7B, an insulating layer 11 of alumina, for example, having a thickness of about 3 to 4μm is formed over the entire surface. The insulating layer 11 is then polished through chemical mechanical polishing (CMP), for example, until the second layer 8b and the third layer 8c of the top shield layer 8 are exposed, and the surface is flattened. Although the coil 10 is not exposed in FIG. 7A and FIG. 7B, the coil 10 may be exposed.

Next, as shown in FIG. 8A and FIG. 8B, a recording gap layer 12 made of an insulating material whose thickness is 150 to 200 nm, for example, is formed on the second layer 8b and the third layer 8c of the top shield layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of an alumina film is formed through CVD, materials used are trimethyl aluminum ($Al(CH_3)_3$) and $H_2O$, for example. Through the use of CVD, it is possible to make the thin and precise gap layer 12 of high quality with few pinholes.

Next, a portion of the recording gap layer 12 located on the third layer 8c of the top shield layer 8 is etched to form a contact hole for making the magnetic path.

Next, as shown in FIG. 9A and FIG. 9B, the top pole layer 13 made of a magnetic material and having a thickness of 3μm, for example, is formed into a specific shape on the recording gap layer 12. The top pole layer 13 may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made of a number of layers of inorganic insulating films and magnetic layers of Permalloy, for example.

The top pole layer 13 includes a pole portion located on a side of the air bearing surface 30. The pole portion has a width equal to the track width of the recording head, and faces the second layer 8b of the top shield layer 8, the recording gap layer 12 being placed between the pole portion and the second layer 8b. The top pole layer 13 has a portion near an end thereof that is opposite to the air bearing surface 30. This portion is connected to the third layer 8c of the top shield layer 8. The top pole layer 13 is thereby magnetically connected to the top shield layer (bottom pole layer) 8.

Next, the recording gap layer 12 is selectively etched through dry etching, using the pole portion of the top pole layer 13 as a mask. Furthermore, the second layer 8b of the top shield layer 8 is selectively etched by about 0.3 to 0.6μm through argon ion milling, for example. A trim structure as shown in FIG. 9B is thus formed. The trim structure suppresses an increase in the effective track width due to expansion of a magnetic flux generated during writing in a narrow track.

Next, an overcoat layer 14 of alumina, for example, having a thickness of 20 to 30μm, for example, is formed over the entire surface. The surface of the overcoat layer 14 is then flattened and pads (not shown) for electrodes are formed on the overcoat layer 14. Finally, lapping of the slider including the foregoing layers is performed to form the air bearing surfaces of the thin-film magnetic head including the recording head and the reproducing head. The thin-film magnetic head of the embodiment is thus completed.

In this embodiment the bottom shield layer 3 corresponds to a first shield layer of the invention. The top shield layer 8 corresponds to a second shield layer of the invention.

The top shield layer (bottom pole layer), the recording gap layer 12, the top pole layer 13 and the thin-film coil 10 correspond to an induction-type magnetic transducer of the invention.

As described so far, the thin-film magnetic head made through the manufacturing method of the embodiment comprises the medium facing surface that faces toward a recording medium (air bearing surface 30), the reproducing head and the recording head (induction-type magnetic transducer). The reproducing head includes the GMR element 5, and the bottom shield layer 3 and the top shield layer 8 for shielding the GMR element 5. Portions of the bottom shield layer 3 and the top shield layer 8 facing toward the recording medium are opposed to each other, the GMR element 5 being placed between the portions. The reproducing head further includes: the conductive layers 6 connected to the GMR element 5; the first shield gap film 4a; the second shield gap film 4b; the third shield gap film 7a; and the fourth shield gap film 7b. The first shield gap film 4a is placed between the bottom shield layer 3 and the GMR element 5 together with the conductive layers 6. The second shield gap film 4b is located around the GMR element 5 and placed between the first shield gap film 4a and the conductive layers 6. The third shield gap film 7a is placed between the top shield layer 8 and the GMR element 5 together with the conductive layers 6. The fourth shield gap film 7b is located between the third shield gap film 7a and the top shield layer 8 except the region corresponding to the GMR element 5. The reproducing head of this embodiment corresponds to a magnetoresistive device of the invention, too.

The recording head includes the bottom pole layer (top shield layer 8) and the top pole layer 13 magnetically coupled to each other, each of which includes at least one layer. The bottom pole layer and the top pole layer 13 include the pole portions opposed to each other and placed in regions on a side of the air bearing surface 30. The recording head further includes: the recording gap layer 12 placed between the pole portion of the bottom pole layer and the pole portion of the top pole layer 13; and the thin-film coil 10 at least a part of which is placed between the bottom pole layer and the top pole layer 13, the at least part of the coil 10 being insulated from the bottom pole layer and the top pole layer 13.

Figure 13:
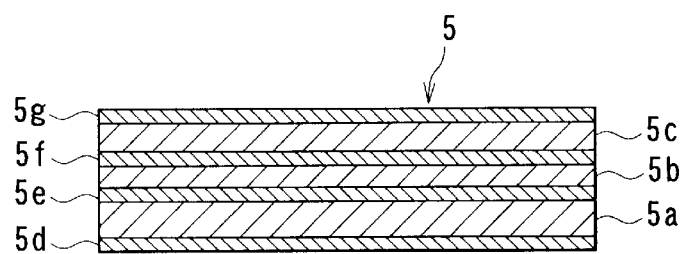
FIG. 13 is a cross section for illustrating an example of the configuration of the GMR element of the embodiment of the invention.

Reference is now made to FIG. 13 to describe an example of the configuration of the GMR element 5 of this embodiment. In this example the GMR element 5 has: a base layer 5d made of Ta, for example; an antiferromagnetic layer 5a made of PtMn, for example; a magnetic layer 5e made of Co, for example; a nonmagnetic layer 5b made of Cu, for example; a magnetic layer 5f made of Co, for example; a free layer (magnetic layer) 5c made of NiFe, for example; and a protection layer 5g made of Ta, for example. These layers are stacked in this order on the first shield gap film 4a. The antiferromagnetic layer 5a, the nonmagnetic layer 5b and the free layer 5c are only illustrated in the following description for simplification.

Reference is now made to FIG. 14 to FIG. 20 to describe the procedure of making the reproducing head of this embodiment, that is, the magnetoresistive device. FIG. 14 to FIG. 20 are cross sections of the pole portion parallel to the air bearing surface.

Figure 14:
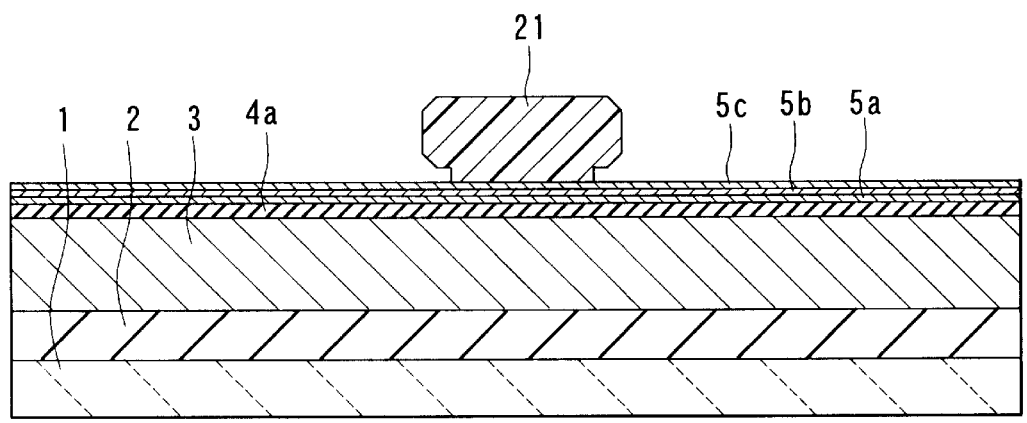
FIG. 14 is a cross section for illustrating a step in the method of manufacturing the thin-film magnetic head of the embodiment.

FIG. 14 illustrates the state in which the layers 5a, 5b and 5c making up the GMR element 5 have been formed on the first shield gap film 4a, and the photoresist pattern 21 having a T-shaped cross section has been formed on the layer 5c. The antiferromagnetic layer 5a has a thickness of 10 to 20 nm, for example. The nonmagnetic layer 5b has a thickness of 2 nm, for example. The free layer 5c has a thickness of 3 to 6 nm, for example. The layers 5a, 5b and 5c at this point correspond to a film for making the magnetoresistive element of the invention.

Figure 15:
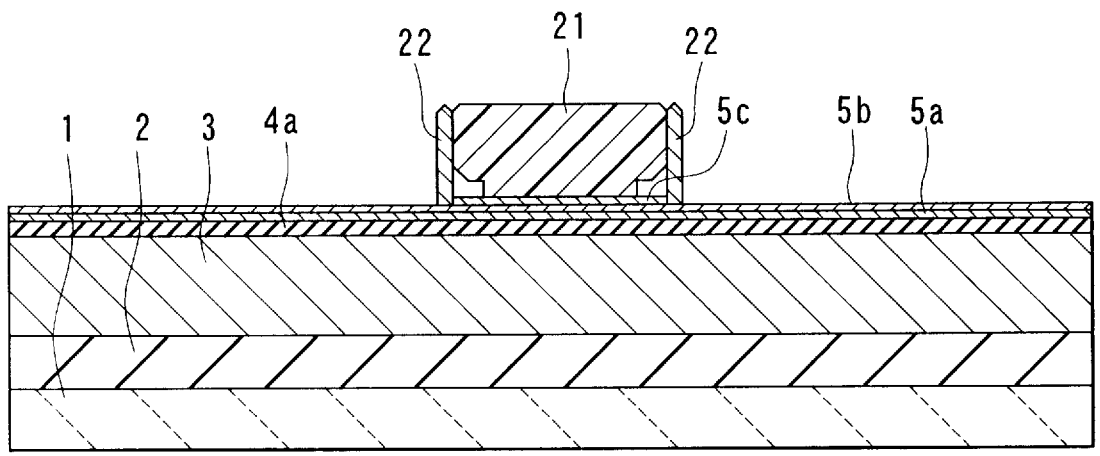
FIG. 15 is a cross section for illustrating a step that follows FIG. 14.

In the following step of this embodiment, as shown in FIG. 15, with the photoresist pattern 21 as a mask, a first dry etching is performed in a portion where the layers making up the GMR element 5 are to be etched. The first etching is performed to etch some of the layers making up the GMR element 5, that is, a part of the thickness of the layers from the top surface. For example, this etching is performed at least as deep as the free layer 5c. The first dry etching includes a chemical etching aspect and a physical etching aspect. This step is called a first etching step. The first dry etching may be reactive ion etching (that may be called reactive sputter etching or reactive ion sputter etching) using a freon-base gas etchant.

In the first etching step some of the layers making up the GMR element 5 from the bottom, such as the antiferromagnetic layer 5a and the layers below it, or the base layer 5d only, are left unremoved. As a result, damage to the first shield gap film 4a caused by the dry etching is prevented.

In the following step of this embodiment, with the photoresist pattern 21 as a mask, a second dry etching is performed in the portion where the layers making up the GMR element 5 are to be etched. The second etching is performed to etch some of the layers making up the GMR element 5, that is, the layers left unremoved when the first etching was performed. For example, this etching is performed to etch the nonmagnetic layer 5b and the layers below it. In the second dry etching a proportion of physical etching is greater than that of the first dry etching. This step is called a second etching step. The second dry etching may be ion milling.

Figure 16:
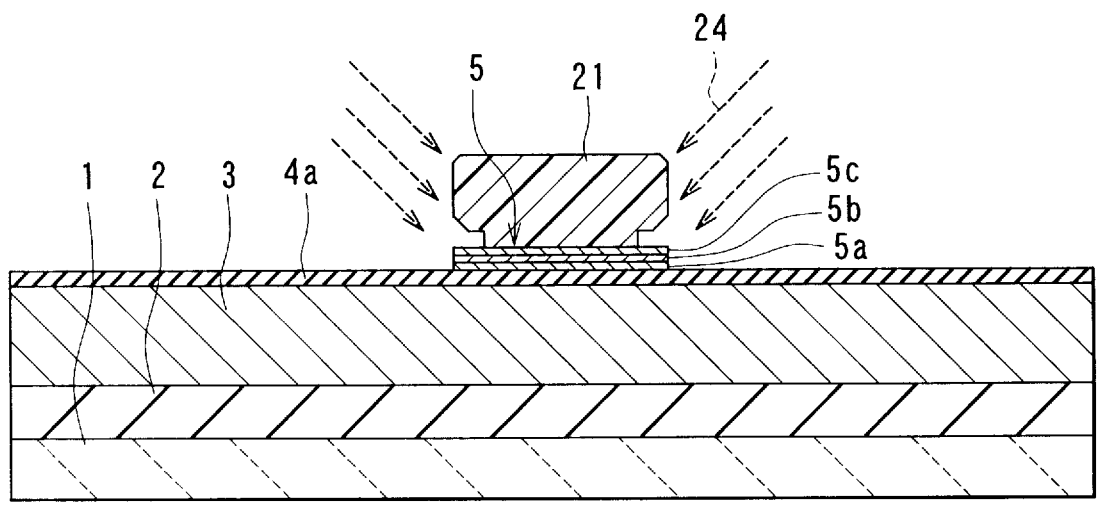
FIG. 16 is a cross section for illustrating a step that follows FIG. 15.

As shown in FIG. 15, etching residues 22 may redeposite on the lateral surface of the photoresist pattern 21 in the first etching step. Therefore, as shown in FIG. 16, ion milling may be performed in the second etching step wherein the incident angle of ion beams 24 is 45 or 70 degrees to remove the etching residues 22 and the layers left unremoved in the first etching step.

The second etching step is performed to etch only some of the layers making up the GMR element 5, instead of etching all of these layers. Therefore, the time required for performing the second etching is short. As a result, very little damage is done to the first shield gap film 4a even through ion milling is performed as the second etching.

Through the foregoing first and second etching steps, the layers making up the GMR element 5 are etched and patterned. The GMR element 5 is thereby formed. The GMR element 5 thus formed has side walls nearly orthogonal to the top surface of the first shield gap film 4a since the second etching is anisotropic. The MR height is defined by the length of the GMR element 5 between its end located in the air bearing surface and the other end.

Figure 17:
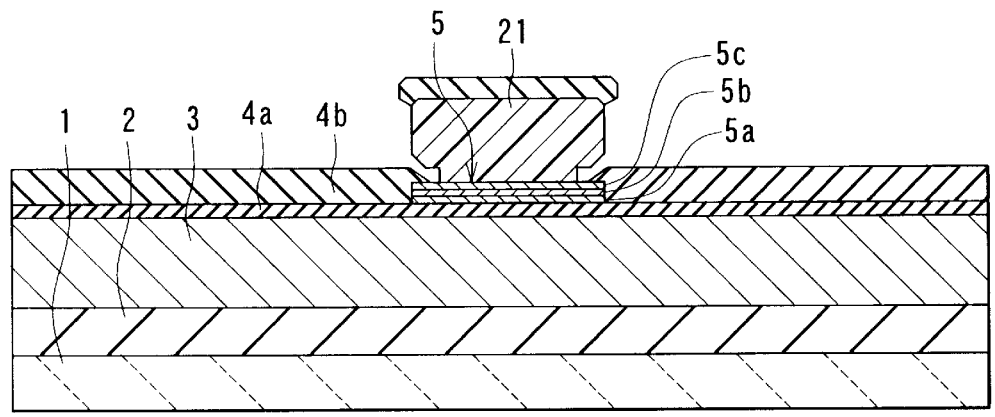
FIG. 17 is a cross section for illustrating a step that follows FIG. 16.

Next, as shown in FIG. 17, using the photoresist pattern 21 as a mask, the second shield gap film 4b as the second insulating layer is formed through sputtering, for example, around the GMR element 5 on top of the first shield gap film 4a. The second shield gap film 4b is made of an insulating material such as alumina and has a thickness of 100 to 300 nm, for example. The photoresist pattern 21 is then lifted off. The second shield gap film 4b is thus formed around the GMR element 5. As a result, even if the first shield gap film 4a is damaged due to over-etching in the second etching step, the portion damaged is covered with the second shield gap film 4b. Insulation will be thereby sufficiently maintained between the bottom shield layer 3 and the conductive layers 6 formed later.

When the second shield gap film 4b is formed around the GMR element 5, the second shield gap film 4b may extend over the top surface of the GMR element 5, as shown in FIG. 17. If the third shield gap film 7a is formed on the second shield gap film 4b in this state, the total thickness of the insulating layer including the shield gap films 4b and 7a is made uneven in the portion facing the top surface of the GMR element 5.

Figure 18:
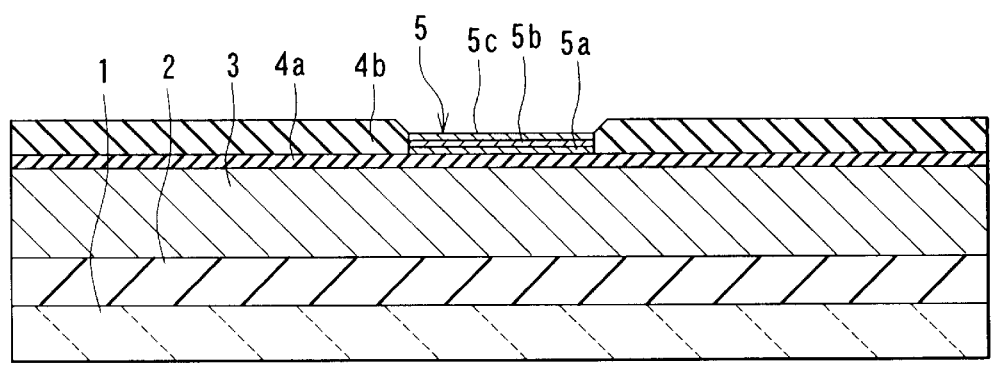
FIG. 18 is a cross section for illustrating a step that follows FIG. 17.

Therefore, in this embodiment, the top surface of the GMR element 5 is etched by about 1 nm to remove the portion of the second shield gap film 4b extending over the top surface of the GMR element 5, as shown in FIG. 18. It is thereby possible to form the thin third shield gap film 7a that is even in thickness on the GMR element 5. As a result, it is possible to make the insulating layer formed on the GMR element 5 even in thickness, and to improve the characteristic of the reproducing head.

Figure 19:
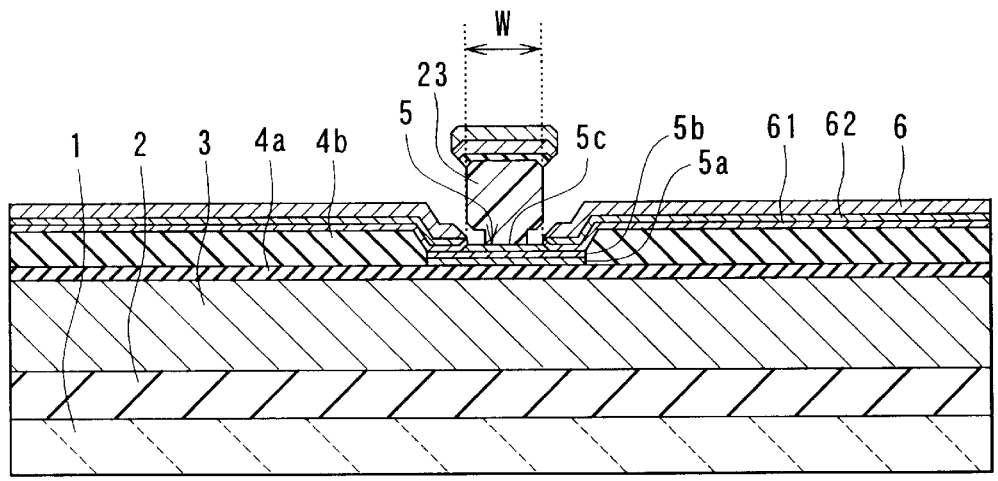
FIG. 19 is a cross section for illustrating a step that follows FIG. 18.

Next, as shown in FIG. 19, the additional photoresist pattern 23 for determining the track width of the reproducing head is formed on the GMR element 5. Next, with the photoresist pattern 23 as a mask, etching is performed to etch portions of some upper layers of the layers making up the GMR element 5. The portions thus etched are outer portions of the part that defines the track width, these portions being located at the ends of the width of this part. The layers thus etched may be a part of the thickness of the free layer 5c or the entire free layer 5c, or the free layer 5c and the nonmagnetic layer 5b.

Next, a pair of layers 61 are formed around the GMR element 5 and the portion etched as described above. The layers 61 are made of a material the same as that of the layer(s) etched, such as the free layer 5c. This material may be NiFe. The layers 61 are provided for improving electrical connection between the GMR element 5 and the conductive layers 6. Next, a pair of antiferromagnetic layers 62 made of RuRhMn or IrMn, for example, are formed on the layers 61.

Since the layers 61 of NiFe and the antiferromagnetic layers 62 are thus formed on top of the part of the GMR element 5, the reproducing head has the configuration utilizing the exchange bias method (that may be called the boundary control stabilizer [BCS] method). As shown in FIG. 19, track width W is defined by the width of the space of the layers 61 and 62 on top of the GMR element 5.

Next, a pair of conductive layers 6 having a thickness of tens to a hundred and tens of nanometers are formed on the antiferromagnetic layers 62. The conductive layers 6 may be made of Ta or Au. The photoresist pattern 23 is then lifted off. Next, although not shown, a film of copper (Cu) having a thickness of 50 to 100 nm is formed on the conductive layers 6 through a lift-off process in order to reduce the resistance of the conductive layers 6.

Figure 20:
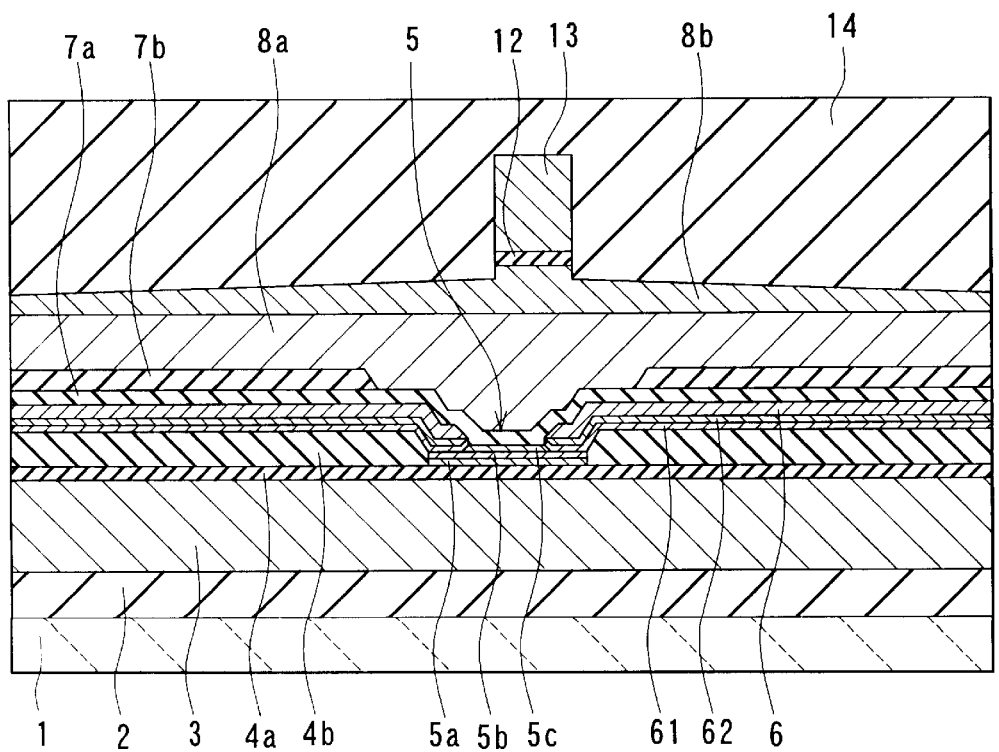
FIG. 20 is a cross section for illustrating a step that follows FIG. 19.
Figure 21:
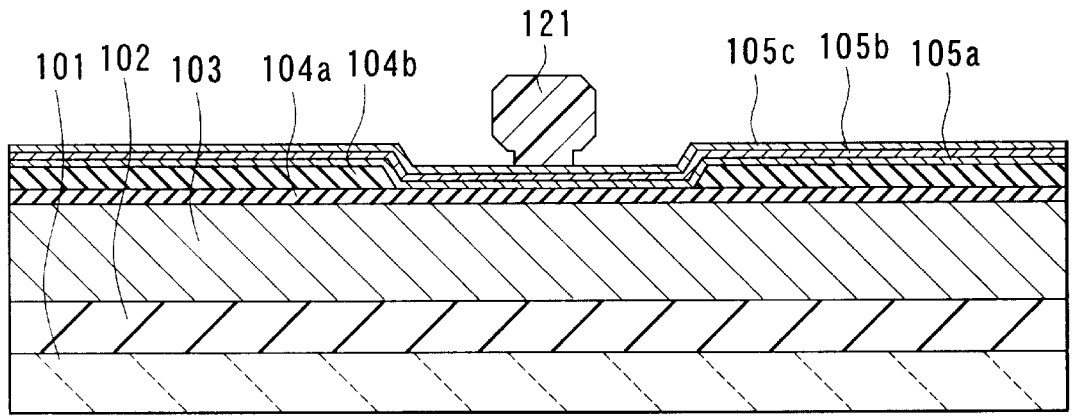
FIG. 21 is a cross section for illustrating a step in the method of manufacturing the thin-film magnetic head of related art.
Figure 22:
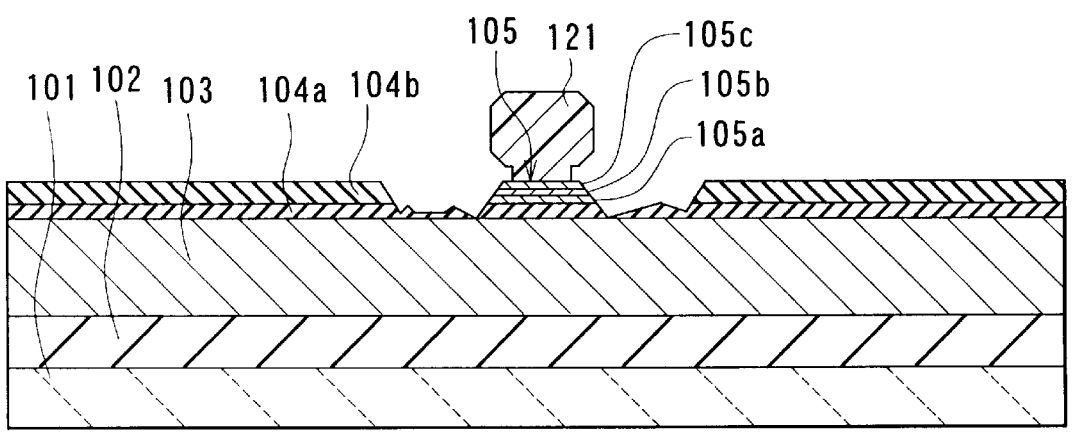
FIG. 22 is a cross section for illustrating a step that follows FIG. 21.
Figure 23:
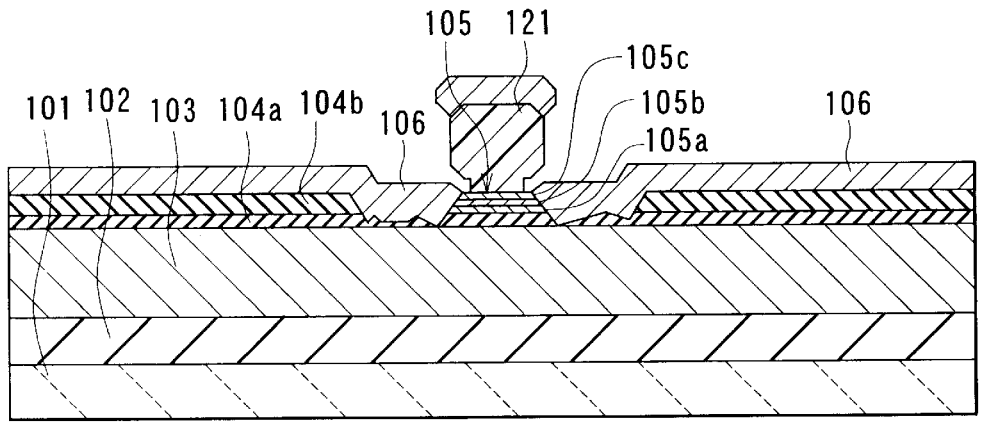
FIG. 23 is a cross section for illustrating a step that follows FIG. 22.
Figure 24:
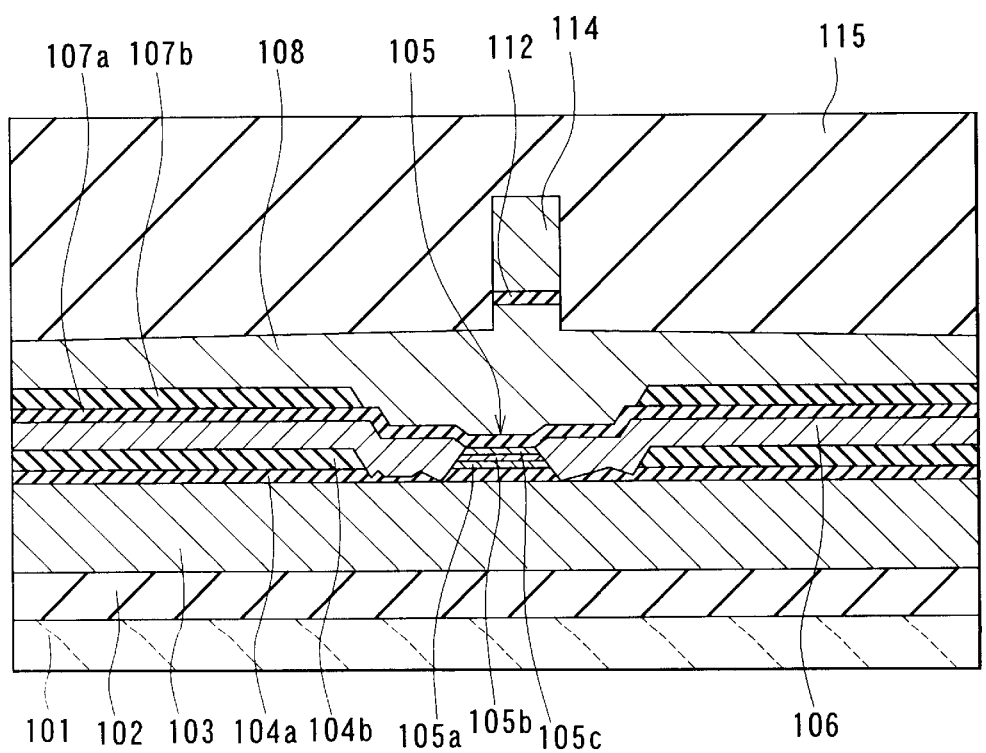
FIG. 24 is a cross section for illustrating a step that follows FIG. 23.
Figure 25:
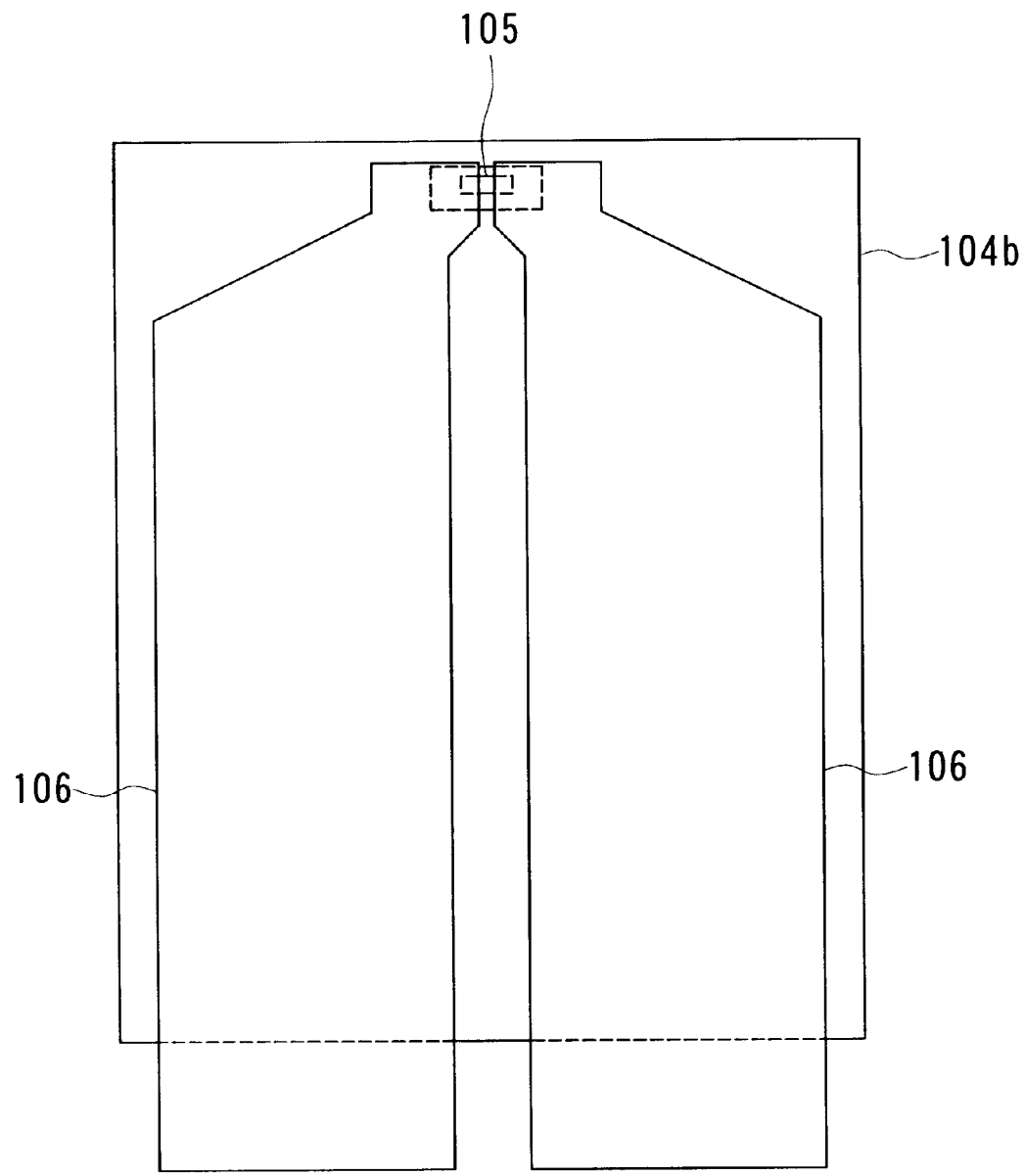
FIG. 25 is top view corresponding to FIG. 23.
Figure 26:
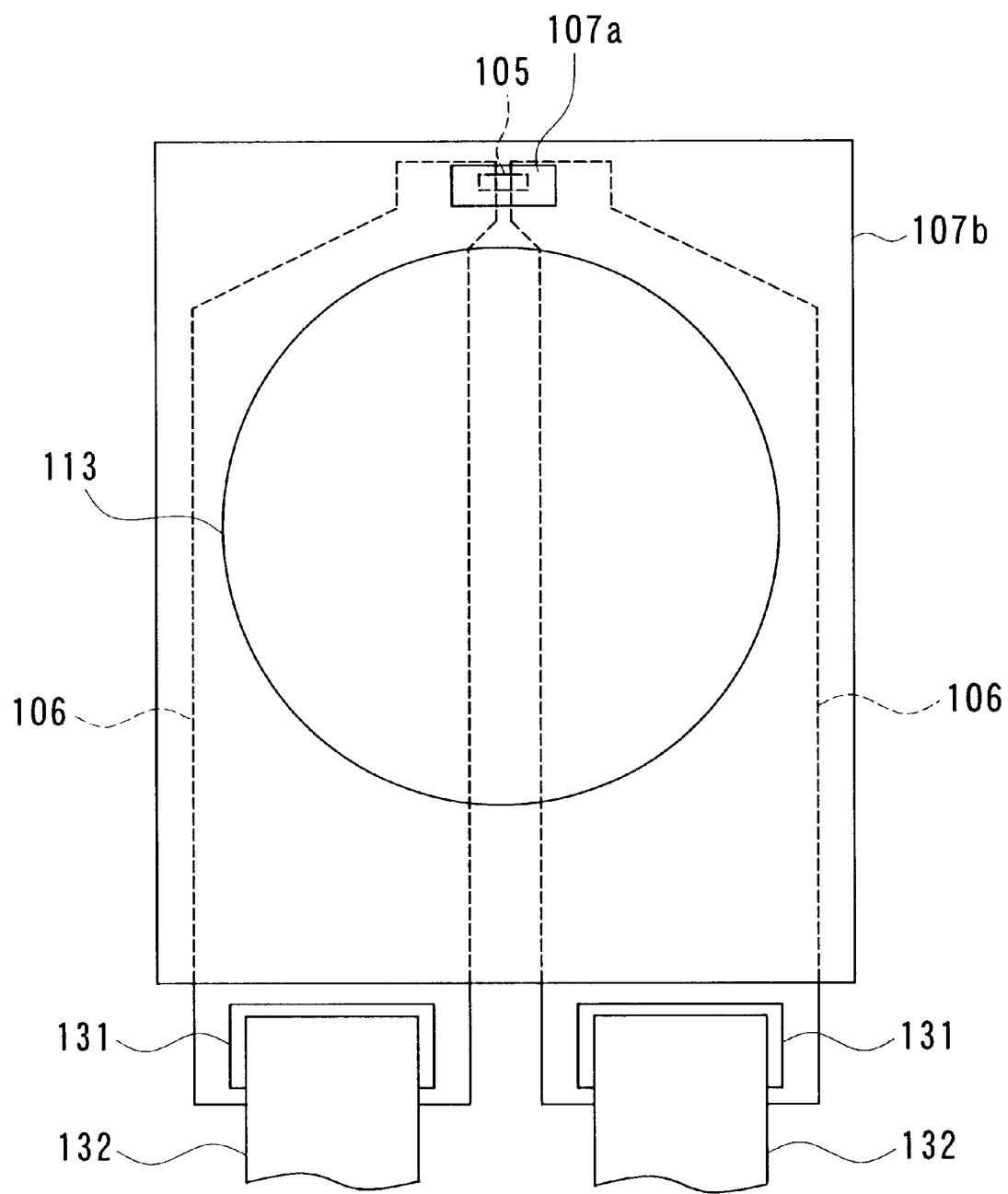
FIG. 26 is top view corresponding to FIG. 24.

Next, as shown in FIG. 20, the third shield gap film 7a having a thickness of 20 to 40 nm, for example, is formed as the third insulating layer on the GMR element 5, the second shield gap film 4b and the conductive layers 6. As described above, the shield gap film 7a may be an alumina film formed through CVD. In this case, it is preferred to perform CVD at a temperature of 300° C. or lower to prevent deterioration of the antiferromagnetic layer 5a susceptible to heat.

Next, the fourth shield gap film 7b is formed through sputtering, for example, in a region on top of the shield gap film 7a except the region corresponding to the GMR element 5. The fourth shield gap film 7b is made of an insulating material such as alumina and has a thickness of 50 to 150 nm, for example.

The steps already described are then performed, and the thin-film magnetic head is completed as shown in FIG. 20.

According to the embodiment thus described, the first etching step is performed to etch a part of the thickness of the portion to be etched of the layers 5a, 5b and 5c making up the GMR element 5. In the first etching step the first etching including a chemical etching aspect and a physical etching aspect is performed. The second etching step is then performed to etch the remaining part of the portion to be etched of the layers 5a, 5b and 5c. In the second etching step the second etching is performed wherein the proportion of physical etching is greater than that of the first etching. The GMR element 5 is thus formed. As a result, according to the embodiment, it is possible to prevent damage to the first shield gap film 4a. In the embodiment the second shield gap film 4b is formed to cover the first shield gap film 4a before the conductive layers 6 are formed. It is thereby possible to obtain insulation between the conductive layers 6 and the bottom shield layer 3. Owing to these features of the embodiment, it is possible to prevent a short circuit between the bottom shield layer 3 and the conductive layers 6 connected to the GMR element 5, and to reduce noise affecting the GMR element 5.

According to the embodiment, the second etching step wherein the proportion of physical etching is greater is performed to etch the etching residues produced in the first etching step and the layers left unremoved in the first etching step. It is thereby possible to define the geometry of the GMR element 5 with accuracy. The embodiment thus allows precise control of the MR height and implements the reproducing head with a low MR height.

According to the embodiment, after the second shield gap film 4b is formed, a portion of the shield gap film 4b extending over the top surface of the GMR element 5 is removed. As a result, it is possible to make the insulating layer formed on the GMR element 5 even in thickness, and to improve the characteristic of the reproducing head.

According to the embodiment, if the shield gap films 4a and 7a are formed through CVD, the thin films 4a and 7a of high quality are formed. It is thereby possible to improve the characteristic of the reproducing head. Since an alumina film formed through CVD can be made thin and has excellent step coverage, it is particularly suitable for the third shield gap film 7a formed on top of the GMR element 5 where there are asperities.

According to the embodiment, the shield gap films 4a and 7a are made sufficiently thin in order to improve thermal asperity. It is thereby possible to improve the characteristic of the reproducing head.

In the embodiment the thin-film coil 10 is placed on top of the first layer 8a of the top shield layer 8 and on a side of the second layer 8b, and the top surface of the insulating layer 11 that covers the coil 10 is flattened. As a result, the top pole layer 13 is formed on the flat surface. Therefore, according to the embodiment, the dimensions of the pole portion of the top pole layer 13 may be reduced to the half-micron or quarter-micron order. The track width of the recording head is thereby reduced.

According to the embodiment, the throat height is not defined by the pole portion of the top pole layer 13 that defines the track width of the recording head, but by the second layer 8b of the top shield layer (bottom pole layer) 8. As a result, the throat height is uniformly defined with precision even if the track width is reduced.

According to the embodiment, the thin-film coil 10 is formed on the flat surface on a side of the second layer 8b of the top shield layer 8. It is thereby possible to reduce the size of the coil 10. In addition, it is possible that an end of the coil 10 is located near the zero throat height position, that is, an end of the second layer 8b opposite to the air bearing surface 30. Owing to these features, a reduction in yoke length of the recording head is achieved.

The present invention is not limited to the foregoing embodiment. For example, although the first dry etching is reactive ion etching and the second dry etching is ion miring in the embodiment, the combination of the first dry etching and the second dry etching is not limited to this embodiment. For example, it is possible that the first dry etching is reactive ion etching and the second dry etching is sputter etching, or the first dry etching is sputter etching and the second dry etching is ion milling.

Although the magnetoresistive element of the foregoing embodiment is a spin valve GMR element, the invention may be applied to the cases in which the magnetoresistive element is an AMR element, a GMR element other than a spin valve element, or a tunnel magnetoresistive (TMR) element. The configuration of the spin valve GMR element is not limited to the one shown in FIG. 13.

In the foregoing embodiment the thin-film magnetic head disclosed comprises the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

A base body having a concavity is preferred for the thin-film magnetic head having such a structure. If the coil is formed in the concavity of the base body, the thin-film magnetic head may be further reduced in size.

If the thin-film magnetic head is used for reading only, the head may comprise a magnetoresistive element for reading only.

The magnetoresistive device of the invention is not only limited to a reproducing head of a thin-film magnetic head but may be applied to a rotational position sensor, a magnetic sensor, a current sensor and so on.

According to the method of manufacturing the thin-film magnetic head or the method of manufacturing the magnetoresistive device of the invention thus described, the first etching step is performed to etch a part of the thickness of the portion to be etched of the films for making the magnetoresistive element. The second etching step is then performed to etch the remaining part of the portion to be etched of the films. The magnetoresistive element is thus formed. As a result, it is possible to prevent damage to the first insulating layer, and to obtain insulation between the conductive layer and the first shield layer by means of the second insulating layer. It is thereby possible to prevent a short circuit between the shield layer and the conductive layer connected to the magnetoresistive element. In addition, the second etching step allows precise control of the geometry of the magnetoresistive element.

According to the method of manufacturing the thin-film magnetic head or the method of manufacturing the magnetoresistive device of the invention, after the second insulating layer is formed, a portion of the second insulating layer extending over the top surface of the magnetoresistive element may be removed. In this case, it is possible to make the insulating layer formed on the magnetoresistive element even in thickness, and to improve the characteristic of the thin-film magnetic head or the magnetoresistive device.

According to the method of manufacturing the thin-film magnetic head or the method of manufacturing the magnetoresistive device of the invention, an alumina film may be formed as an insulating layer through chemical vapor deposition in at least one of the step of forming the first insulating layer and the step of forming the third insulating layer. In this case, a thin insulating layer of high quality is formed. It is thereby possible to improve the characteristic of the thin-film magnetic head or the magnetoresistive device.

In each of the methods of the invention, an alumina film may be formed as the insulating layer through chemical vapor deposition at a temperature of 300° C. or lower in the step of forming the third insulating layer. In this case, it is possible to prevent deterioration of the magnetoresistive element.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising: a medium facing surface that faces toward a recording medium; a magnetoresistive element; a first shield layer and a second shield layer for shielding the magnetoresistive element, the shield layers having portions located on a side of the medium facing surface and opposed to each other, the magnetoresistive element being placed between the portions; a conductive layer connected to the magnetoresistive element; a first insulating layer provided between the first shield layer and the magnetoresistive element together with the conductive layer; a second insulating layer provided between the first insulating layer and the conductive layer and located around the magnetoresistive element; and a third insulating layer provided between the second shield layer and the magnetoresistive element together with the conductive layer; the method including the steps of:

forming the first shield layer;

forming the first insulating layer on the first shield layer;

forming a film for making the magnetoresistive element on the first insulating layer;

forming the magnetoresistive element by selectively etching the film for making the magnetoresistive element;

forming the second insulating layer on the first insulating layer;

forming the conductive layer on the second insulating layer;

forming the third insulating layer on the magnetoresistive element, the second insulating layer and the conductive layer; and forming the second shield layer on the third insulating layer; wherein the step of forming the magnetoresistive element includes:
- a first etching step wherein a first dry etching is performed to etch a part of a thickness of a portion to be etched of the film for making the magnetoresistive element, the first dry etching including-a chemical etching and a physical etching; and
- a second etching step wherein a second dry etching is performed to etch the remaining part of the portion of the film for making the magnetoresistive element, the second dry etching having a proportion of physical etching greater than that of the first dry etching.

2. The method according to claim 1 wherein the first dry etching is reactive ion etching.

3. The method according to claim 1 wherein the second dry etching is ion miling.

4. The method according to claim 1 wherein the magnetoresistive element is made up of a plurality of layers.

5. The method according to claim 4, further including the steps of: after the second insulating layer is formed, etching portions of one or some upper layers of the layers making up the magnetoresistive element, the portions thus etched being outer portions of a part that defines a track width, these portions being located at ends of the width of this part; and, after this etching step, forming an additional layer made of a material the same as that of the layer or layers etched and an antiferromagnetic layer stacked on the additional layer, the additional layer and the antiferromagnetic layer being formed around the portions etched and the magnetoresistive element; wherein
the conductive layer is formed on the antiferromagnetic layer in the step of forming the conductive layer.

6. The method according to claim 1 wherein the magnetoresistive element is a spin valve giant magnetoresistive element in which a free layer is located in an upper portion thereof.

7. The method according to claim 6, further including the steps of: after the second insulating layer is formed, etching portions of the free layer of the magnetoresistive element, the portions thus etched being outer portions of a part that defines a track width, these portions being located at ends of the width of this part; and, after this etching step, forming an additional layer made of a material the same as that of the free layer and an antiferromagnetic layer stacked on the additional layer, the additional layer and the antiferromagnetic layer being formed around the portions etched and the magnetoresistive element; wherein
the conductive layer is formed on the antiferromagnetic layer in the step of forming the conductive layer.

8. The method according to claim 1, further including the step of removing a portion of the second insulating layer extending over a top surface of the magnetoresistive element after the second insulating layer is formed.

9. The method according to claim 1 wherein an alumina film is formed as the insulating layer through chemical vapor deposition in at least one of the step of forming the first insulating layer and the step of forming the third insulating layer.

10. The method according to claim 9 wherein the chemical vapor deposition is low-pressure chemical vapor deposition.

11. The method according to claim 9 wherein the chemical vapor deposition is plasma chemical vapor deposition.

12. The method according to claim 1 wherein an alumina film is formed as the insulating layer through chemical vapor deposition at a temperature of 300° C. or lower in the step of forming the third insulating layer.

13. The method according to claim 1, further including the step of forming an induction-type magnetic transducer including: first and second magnetic layers magnetically coupled to each other and including magnetic pole portions opposed to each other, the pole portions being located in regions on a side of the medium facing surface, the magnetic layers each including at least one layer; a gap layer placed between the pole portions of the magnetic layers; and a thin-film coil at least a part of which is placed between the magnetic layers, the at least part of the coil being insulated from the magnetic layers.

14. A method of manufacturing a magnetoresistive device comprising: a magnetoresistive element; a first shield layer and a second shield layer for shielding the magnetoresistive element, the shield layers being opposed to each other, the magnetoresistive element being placed between the shield layers; a conductive layer connected to the magnetoresistive element; a first insulating layer provided between the first shield layer and the magnetoresistive element together with the conductive layer; a second insulating layer provided between the first insulating layer and the conductive layer and located around the magnetoresistive element; and a third insulating layer provided between the second shield layer and the magnetoresistive element together with the conductive layer; the method including the steps of:
forming the first shield layer;
forming the first insulating layer on the first shield layer;
forming a film for making the magnetoresistive element on the first insulating layer;
forming the magnetoresistive element by selectively etching the film for making the magnetoresistive element;
forming the second insulating layer on the first insulating layer;
forming the conductive layer on the second insulating layer;
forming the third insulating layer on the magnetoresistive element, the second insulating layer and the conductive layer; and
forming the second shield layer on the third insulating layer; wherein the step of forming the magnetoresistive element includes:
- a first etching step wherein a first dry etching is performed to etch a part of a thickness of a portion to be etched of the film for making the magnetoresistive element, the first dry etching including a chemical etching and a physical etching; and
- a second etching step wherein a second dry etching is performed to etch the remaining part of the portion of the film for making the magnetoresistive element, the second dry etching having a proportion of physical etching greater than that of the first dry etching.

15. The method according to claim 14 wherein the first dry etching is reactive ion etching.

16. The method according to claim 14 wherein the second dry etching is ion milling.

17. The method according to claim 14 wherein the magnetoresistive element is made up of a plurality of layers.

18. The method according to claim 17, further including the steps of: after the second insulating layer is formed, etching portions of one or some upper layers of the layers making up the magnetoresistive element, the portions thus etched being outer portions of a part that defines a track width, these portions being located at ends of the width of this part; and, after this etching step, forming an additional layer made of a material the same as that of the layer or layers etched and an antiferromagnetic layer stacked on the additional layer, the additional layer and the antiferromagnetic layer being formed around the portions etched and the magnetoresistive element; wherein the conductive layer is formed on the antiferromagnetic layer in the step of forming the conductive layer.

19. The method according to claim 14 wherein the magnetoresistive element is a spin valve giant magnetoresistive element in which a free layer is located in an upper portion thereof.

20. The method according to claim 19, further including the steps of after the second insulating layer is formed, etching portions of the free layer of the magnetoresistive element, the portions thus etched being outer portions of a part that defines a track width, these portions being located at ends of the width of this part; and, after this etching step, forming an additional layer made of a material the same as that of the free layer and an antiferromagnetic layer stacked on the additional layer, the additional layer and the antiferromagnetic layer being formed around the portions etched and the magnetoresistive element; wherein the conductive layer is formed on the antiferromagnetic layer in the step of forming the conductive layer.

21. The method according to claim 14, further including the step of removing a portion of the second insulating layer extending over a top surface of the magnetoresistive element after the second insulating layer is formed.

22. The method according to claim 14 wherein an alumina film is formed as the insulating layer through chemical vapor deposition in at least one of the step of forming the first insulating layer and the step of forming the third insulating layer.

23. The method according to claim 22 wherein the chemical vapor deposition is low-pressure chemical vapor deposition.

24. The method according to claim 22 wherein the chemical vapor deposition is plasma chemical vapor deposition.

25. The method according to claim 14 wherein an alumina film is formed as the insulating layer through chemical vapor deposition at a temperature of 300° C. or lower in the step of forming the third insulating layer.

* * * * *